United States Patent [19]

Dan et al.

[11] Patent Number: 5,802,301
[45] Date of Patent: Sep. 1, 1998

[54] SYSTEM FOR LOAD BALANCING BY REPLICATING PORTION OF FILE WHILE BEING READ BY FIRST STREAM ONTO SECOND DEVICE AND READING PORTION WITH STREAM CAPABLE OF ACCESSING

[75] Inventors: Asit Dan, West Harrison; Martin Gerhard Kienzle, Somers; Dinkar Sitaram, Yorktown Heights; Philip Shi-lung Yu, Chappaqua, all of N.Y.

[73] Assignee: International Business Machines Corporation, Armonk, N.Y.

[21] Appl. No.: 241,086

[22] Filed: May 11, 1994

[51] Int. Cl.$^6$ .................................................. G06F 13/00
[52] U.S. Cl. ........................... 395/200.53; 395/200.56; 395/675
[58] Field of Search .................... 395/182.04, 441, 395/485, 488, 600; 364/222.81, 238.3, 245.2, 246.3, 248.1, 283.1, 260, 281

[56] References Cited

U.S. PATENT DOCUMENTS

| | | | |
|---|---|---|---|
| 3,654,708 | 4/1972 | Brudner | 434/307 R |
| 4,403,286 | 9/1983 | Fry et al. | 395/675 |
| 4,432,057 | 2/1984 | Daniell et al. | 395/608 |
| 4,435,755 | 3/1984 | Meritt | 395/858 |
| 4,680,729 | 7/1987 | Steinhart | 345/173 |
| 5,093,912 | 3/1992 | Dong et al. | 395/650 |
| 5,163,148 | 11/1992 | Walls | 395/600 |
| 5,239,643 | 8/1993 | Blount et al. | 395/613 |
| 5,263,154 | 11/1993 | Eastridge et al. | 395/575 |
| 5,274,789 | 12/1993 | Costa et al. | 395/425 |
| 5,450,584 | 9/1995 | Sekiguchi et al. | 395/650 |
| 5,511,214 | 4/1996 | Yamada | 395/800 |

OTHER PUBLICATIONS

Sitaram, D; Dan, A., Issues in the Design of Multi–Server File Systems to Cope with Load Skew, IBM T.J. Watson Research Center, 1993.

Load Balancing in a Multi–server Environment by Distributing Operations on Mostly Read Filesets over the Servers, IBM TDB, 1992.

Client Based Load Balancing Algorithm for Multi–Server Environments by Distributing Mostly Read Filesets Operations over the SERvers, IBM TDB, 1993.

Buddy Based Load Balancing Algorithm for Multi–server file systems Improving Server Buffer hit Probability, IBM TDB, 1993.

P. Lougher, D. Shepard, D. Pegler, The impact of Digital Audio and Video on High Speed Storage, Mass Storage Systems 1994 13th IEEE Symposium, 1994.

P. Lougher, D. Shepard, D. Pegler, "Scalable storage servers for digital audio and video," Storage and Recording Systems, IEEE Conference, 1994.

J. Pang, D. Gill, S Zhou, "Implementation and Performance of CLuster–Based File Replication in Large–Scale Distributed Systems," Management of Replicated Data, 1992 Workshop.

*Primary Examiner*—Thomas C. Lee
*Assistant Examiner*—Anderson I. Chen
*Attorney, Agent, or Firm*—Heslin & Rothenberg, P.C.

[57] ABSTRACT

A method and system for improving load balancing in a file server is disclosed. The method includes determining the existence of an overload condition on a storage device, the storage device having a plurality of retrieval streams accessing at least one file thereon; selecting a first retrieval stream reading a file; replicating a portion of said file being read by said first retrieval stream onto a second storage device; and reading the replicated portion of said file on said second storage device with a retrieval stream capable of accessing the replicated portion of said file. The method and system enables the dynamic replication of data objects to respond to fluctuating user demand. The method and system is particularly useful in file servers such as multimedia servers delivering continuously in real time large multimedia files such as movies.

56 Claims, 9 Drawing Sheets

FILE INFO TABLE

| FILE ID | SWITCH POINT | LIST OF REPLICA ADDRESSES |
|---|---|---|
|  |  |  |

*fig. 6*

SYSTEM FOR LOAD BALANCING BY REPLICATING PORTION OF FILE WHILE BEING READ BY FIRST STREAM ONTO SECOND DEVICE AND READING PORTION WITH STREAM CAPABLE OF ACCESSING

BACKGROUND OF THE INVENTION

1. Technical Field

This invention relates to the field of file servers, and in particular to a method and system for improving load balancing in a file server providing sequential file retrieval. More particularly, this invention relates to reducing disk bottlenecks due to fluctuating user demands generated for the continuous delivery in real time of large files including multimedia files, such as video movies.

2. Background Information

The concept of using file servers to allow users access to a large variety of data objects, including movies, has grown significantly over the last several years, with indications that such use will continue through the next decade. Fueling user demand is the potential ease of access to thousands upon thousands of different files, such as movie files.

In file servers, including large multimedia file servers, access to files, including video movie files, on storage devices, such as disks, may be limited by the number of access or retrieval streams capable of accessing the files on the storage devices. When a large number of users demand access to files on a disk, their access may require the use of all available retrieval streams to the disk, and a condition known as disk bottlenecking will occur. Essentially, with a bottlenecked disk, no bandwidth is available to service any further user requests from that disk. Disk bottlenecking, or as it is sometimes referred, load imbalancing, typically occurs when user demand for access to files on a disk is greater than the number of retrieval streams capable of accessing the files. When disk bottlenecking occurs a particular number of users desiring access to the files on the disk are incapable of accessing the desired files due to the unavailability of retrieval streams.

Avoiding such disk bottlenecks due to the imbalance in resource utilization in a multimedia server is critical because of the stringent response time requirements of sequentially based multimedia file server systems.

It is therefore desirable to reduce disk bottlenecks and load imbalances on large multimedia file servers so that greater user demand can be satisfied.

Disk bottlenecking or load imbalancing can be prevented by spreading each file over all the disks in the system. However, spreading each file over all the disks in the system will result in a time-consuming reconfiguration process when a new disk is added to or dropped (due to failure) from the system.

An alternative way to avoid disk bottlenecking is a static approach where all or some of the files in the system are replicated, in their entirety, onto different disks in the system. However, replicating some of the files requires advanced notice of the number of users desiring access to those files. If advanced notice of the number of users desiring access to certain files is known, then those "hot", i.e. highly accessed, files may be replicated prior to retrieval by the users, thereby avoiding a disk bottleneck.

The problem, however, is that the number of users desiring access to certain files at a particular time is not always known and therefore obtaining advance notice of the same is not always possible. Therefore, it is very difficult to respond to user demand fluctuations.

Also, since disk replication space may be limited there may not be sufficient storage area for the replication of complete files on other disks. Furthermore, such space considerations are even more critical when one desires the replication of all files onto all disks. Finally, since the static replication of all the files over all the disks in the system requires considerable disk space, considerable time and cost also will be incurred.

These problems have prevented an adequate system for avoiding load imbalances in file servers, particularly multimedia file servers, which are used by end users to access movie files.

It is therefore desirable to provide an improved load balancing system.

It is also desirable to provide a method and system for improving load balancing in a file server capable of operating without advanced knowledge of the number of users desiring access to a file at a particular time.

It is also desirable to provide a method and system for improving load balancing in a file server where user demand fluctuates.

It is also desirable to provide a method and system for improving load balancing in a file server which is capable of detecting an overload condition while a file is being accessed by one or more retrieval streams.

It is also desirable to provide a method and system for improving load balancing in a file server which is capable of dynamically avoiding load imbalances as users attempt to access a particular file.

It is further desirable to provide a method and system for improving load balancing in a file server which is capable of replicating portions of accessed files onto other storage devices.

It is further desirable to provide a method and system for improving load balancing in a file server which is capable of permitting files to be read from a plurality of disks.

It is also desirable to provide a method and system for improving load balancing for the continuous delivery in real time of large multimedia files such as movies.

SUMMARY OF THE INVENTION

The aforementioned objects and advantages may be achieved through implementation of the method and system for improving load balancing in a file server in accordance with the principles of the present invention.

The invention involves a method for improving load balancing in a file server. The method includes determining the existence of an overload condition on a storage device having a plurality of retrieval streams for accessing at least one file thereon; selecting a first retrieval stream reading a file; replicating a portion of the file being read by the first retrieval stream onto a second storage device; and reading the replicated portion of the file on the second storage device with a retrieval stream capable of accessing the replicated portion of said file.

Determining the existence of an overload condition on a storage device may be accomplished by detecting a threshold level on the storage device. After an overload condition is detected, the first retrieval stream is selectively chosen from the plurality of retrieval streams reading the file. The second storage device may then be chosen from a plurality of storage devices, with the chosen storage device having the largest amount of storage space.

Replicating the portion of the file being read by the first retrieval stream onto the second storage device includes creating a switching point entry on a file information table so that the replicated portion of the file can be indexed for ease of switching between storage devices. Replicating the portion of the file onto the second storage device may comprise reading the file using the first retrieval stream from the first storage device, and then writing the file using the retrieval stream which is capable of accessing the replicated portions of the file onto the second storage device.

Each file may comprise a large number of blocks. Each file may also comprise a small number of segments, with each individual segment comprising a large number of blocks. Segments are preferably sized equally. Replication may involve replicating a plurality of blocks or replicating at least one segment.

Each file includes at least one primary file. Each primary file contains a plurality of primary segments, and primary segments are permanently stored segments. Permanent segments may not be deleted or overwritten. The replicated portions of a file comprise one or more secondary segments, and these secondary segments are temporarily stored segments. Temporary segments may be overwritten or deleted. Depending upon the load history of the storage devices involved, primary segments may be converted to secondary segments, and secondary segments may be converted to primary segments.

Replicating block portions of the file being read by the first retrieval stream onto the second storage device may be accomplished by sequentially reading the plurality of blocks from the first retrieval stream, and writing the blocks onto the second storage device. Replicating segment portions of the file may also involve reading and writing the blocks which comprise each individual segment. Entire segments must be read; individual portions of segments may not be read.

Improving load balancing in the file server may also comprise determining an excess number of primary segments, and marking these excess segments as secondary segments. Again, primary segments are permanently stored segments, and secondary segments are temporarily stored segments. As such, permanent copies may not be deleted while secondary segments may be deleted. By overwriting and therefore deleting secondary segments, unnecessary disk space may be made available.

Improving load balancing in a file server may also involve converting a secondary segment to a primary segment by choosing a secondary segment which satisfies a conversion criteria, and marking the chosen secondary segment as a primary segment.

The file server involved with this method may comprise a multimedia file server. A storage device may comprise a disk.

The invention may also comprise a system for improving load balancing in a file server. The system may include means for determining the existence of an overload condition on a storage device having a plurality of retrieval streams accessing at least one file thereon; means for selecting a first retrieval stream reading a file; means for replicating a portion of the file being read by the first retrieval stream onto a second storage device; and means for reading the replicated portion of the file located on said second storage device with a retrieval stream capable of accessing the replicated portion of said file.

BRIEF DESCRIPTION OF THE DRAWINGS

The foregoing and additional features and advantages of the instant invention will become more readily apparent from the following detailed description of a specific illustrative embodiment thereof, presented herein below in conjunction with the accompanying drawings, in which:

FIG. 6 is a file information table pertaining to the present invention.

BEST MODE FOR CARRYING OUT THE INVENTION

The present invention relates to a method and system for improving load balancing in a file server.

Figure 1:
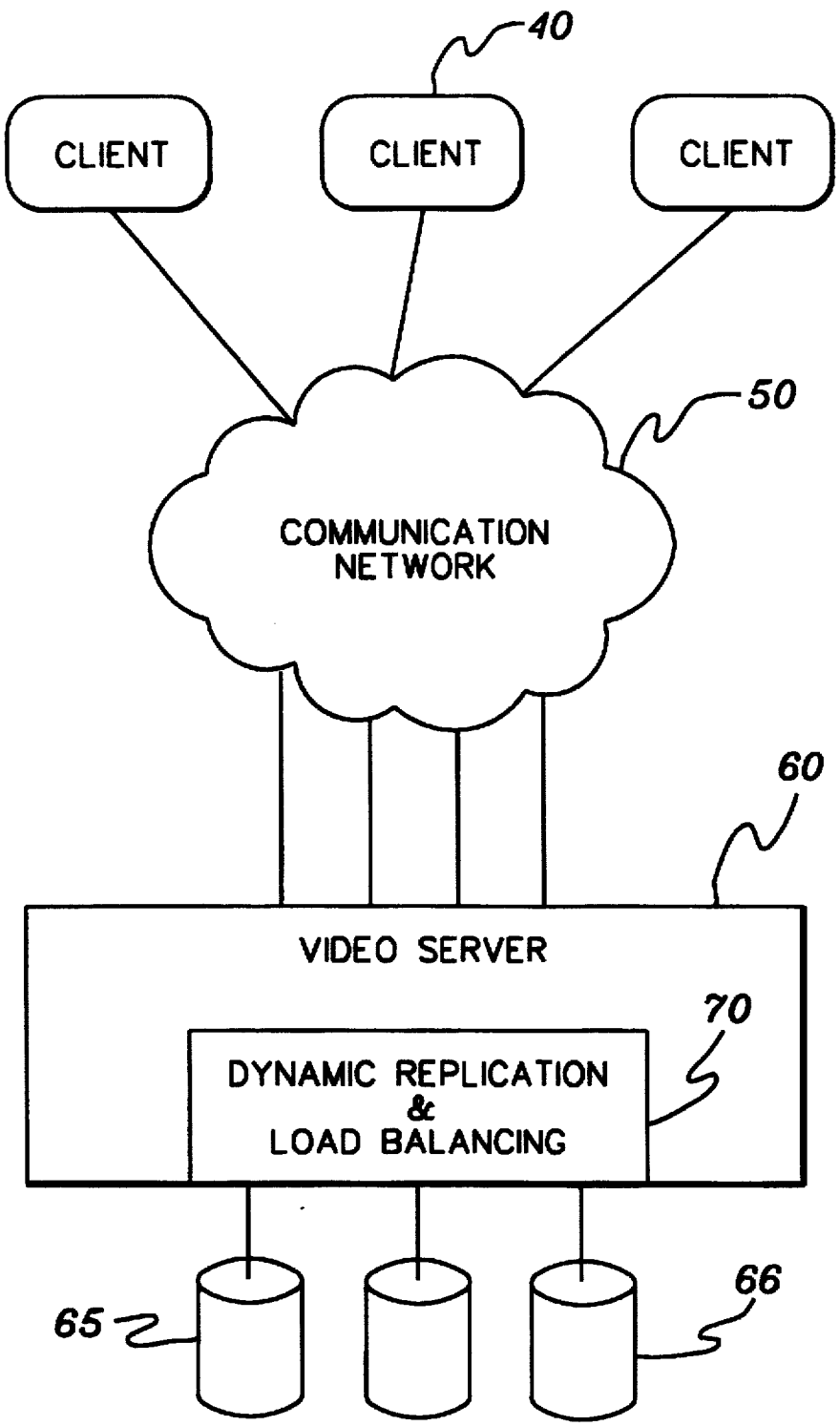
FIG. 1 depicts a block diagram of the load balancing system and related hardware constructed in accordance with the principles of the present invention.

In reference to FIG. 1, load balancing of the present invention occurs within a load balancing means 70 within a video file server 60 interfaced with a communications network 50 accessed by a plurality of users 40. The video file server 60 contains a plurality of storage devices or disks 65, 66. Referring to the flow diagrams of FIGS. 2A–2C, a method for balancing the load in a video file server in accordance with the principles of the present invention will be described.

Figure 2A:
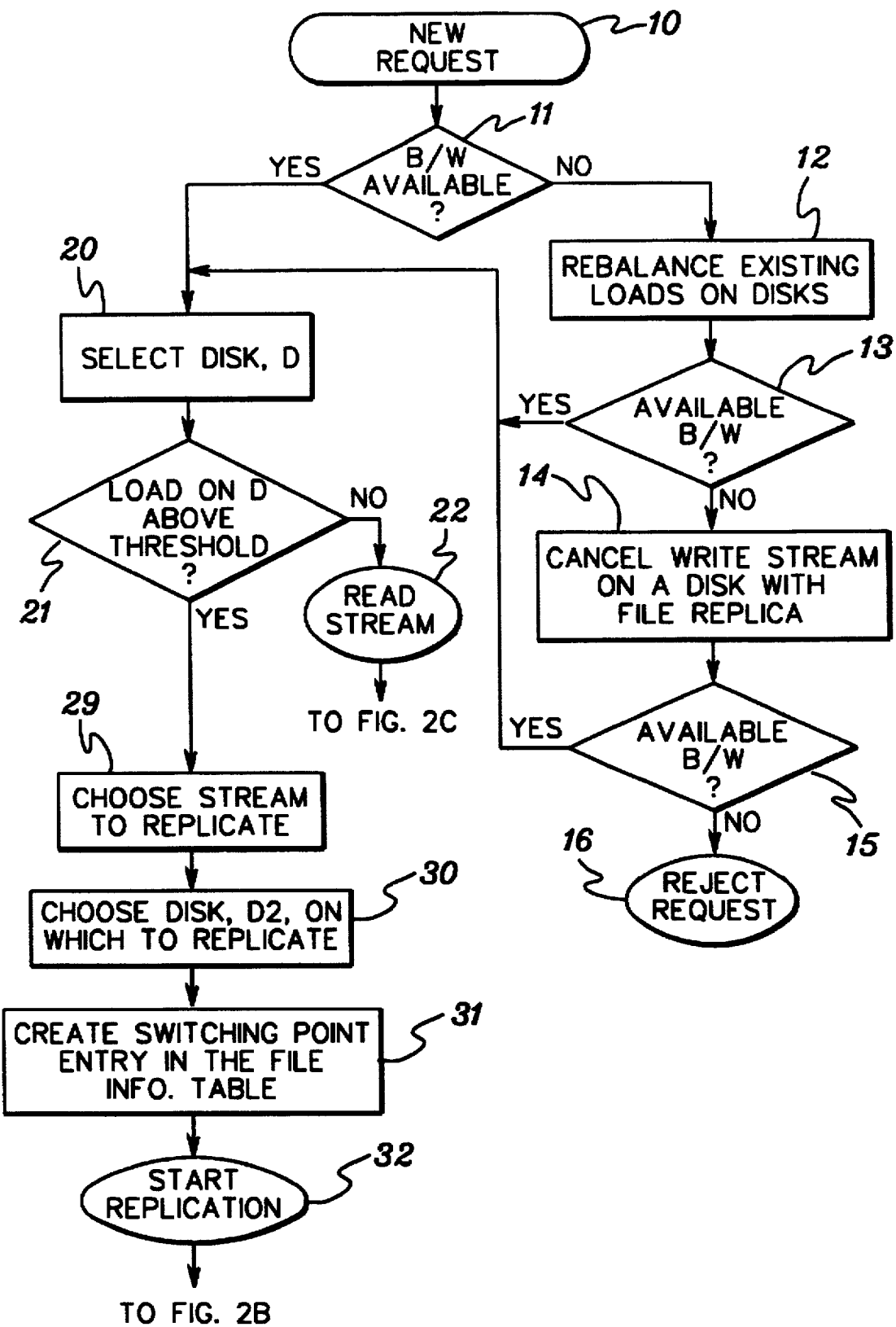
FIGS. 2A–2C depict a first flow diagram of the logic operations of the method and system for improving load balancing in a file server in accordance with the principles of the present invention.

In accordance with the flow diagram of FIG. 2A, the method is initialized at step 10 by a "NEW REQUEST", where a user initiates a request for access to a file located on a disk in a file server. In the next step INQUIRY 11 "BANDWIDTH AVAILABLE?", it is determined whether or not adequate bandwidth is available for the service of a new request. With continuous medium delivery, such as the delivery of movie video files, bandwidth must be reserved. Therefore, for each disk in a system, a number of streams that can simultaneously read files are reserved for user access. The number of streams which can read the files located on a particular disk depends on the storage capability of the disk in question. The file server 60 includes a video server scheduler, which keeps track of the amount of bandwidth allocated to various users on the system disks. If it is determined in step 11 that adequate bandwidth is not available for the service of a new request, then the method proceeds to step 12 "REBALANCE EXISTING LOADS ON DISKS". At this point, the existing loads on all the disks may be rebalanced to make bandwidth available, thereby allowing the user access to the desired file.

For example, a new user desires access to file A. This file A exists in disk 1, but the load is very high on disk 1 because all the access streams to Disk 1 are presently being utilized. As a result, there is no available bandwidth for new user to access file A on disk 1. Since a copy of file B exists on Disk 2, for which the load is low, some of the users accessing file B on disk 1 can be diverted to access file B on disk 2, thereby freeing up bandwidth on disk 1 so that new user can access file A on disk 1. Therefore, those users reading file B on disk 1 will make a switch, and begin reading file B on disk 2.

After an attempt is made to rebalance all the loads on all the disks, again INQUIRY step 13 "AVAILABLE BANDWIDTH?", checks to see if adequate bandwidth exists so that a new request can be serviced. If adequate bandwidth is still not available for service of a new request, then the method proceeds to step 14 "CANCEL WRITE STREAM ON A DISK WITH FILE REPLICA". Since a stream on the disk for which the user desires access may presently—in addition to reading—be writing a portion of a file onto a different storage device, canceling this write stream may make bandwidth available so that a user request can be serviced. On the other hand, if no streams are presently reading a file, and writing to another disk, then no write streams may be canceled. As a result, no bandwidth may be freed up. After step 14 is completed, INQUIRY step 15 "AVAILABLE BANDWIDTH?" again asks whether bandwidth exists to service a new user request. If no bandwidth is available, then the new user request is rejected, as seen in step 16 "REJECT REQUEST", and the user is denied access to the file desired.

If the execution of steps 11, 13, or 15 show that adequate bandwidth is available, then the method evolves to step 20 "SELECT DISK, D". In step 20, disk D represents the disk containing the desired file and having the lowest load at this particular point in time. Since the purpose of this invention is to reduce load imbalances in a file server, a disk which is already heavily loaded is not preferred. Thus, selecting the disk which presently has the lowest load will help reduce future load imbalances.

Once the disk with the lowest load is selected, the method proceeds to INQUIRY step 21, "LOAD ON D ABOVE THRESHOLD?" The threshold represents an arbitrary value which indicates that a load imbalance on the selected disk is near. Therefore, the threshold value should be set at a level close to when a disk bottleneck will occur (yet far enough away so that the system has enough time to compensate for the impending imbalance). If the load on disk D is not above threshold, then there is no present danger of a load imbalance. In such a case, the method proceeds to read the stream, as initialized in step 22 "READ STREAM" and set forth in FIG. 2C, where the user obtains access to the desired file and begins reading the file.

Read stream begins with INQUIRY step 23 "FILE SWITCH POINT". At this inquiry it is determined whether the read stream has come to a switch point of the file being read. A file may consist of a large group of consecutive blocks and a read stream reads consecutively, block by block. A portion of a file may also consist of a large number of blocks, and blocks may be located on different disks. The file switch point therefore represents a location in the file currently being read where a replica, beginning at that particular block, is available on a different disk.

In accordance with the principles of the present invention, replicating arbitrary or non-arbitrary portions of files onto different disks may occur so that load balancing across a file server can be improved. The file switch point thus permits the access stream reading a particular file on a heavily loaded disk to switch over and continue reading the remaining portion of the file on a less heavily loaded disk. Once a switch is made from a heavily loaded disk to a less loaded disk, additional bandwidth becomes available on the heavily loaded disk, thereby improving the load balance on the system. If a file switch point is not reached, then the method proceeds to step 26, "READ NEXT BLOCK", where the next block of the file is sequentially read. Following this step 26, the method reverts to step 23, where again it is determined whether a file switch point is reached. If a file switch point is reached, then step 23 proceeds to INQUIRY step 24 "END OF FILE?", where it is determined if the end of the file has been reached. If the end of the file has not been reached, and since a file switch point has been reached, the method proceeds to step 25, "SELECT A DISK TO READ FROM", where the stream selects the disk from which to begin reading the remaining portion of the accessed file. Preferably, for load balancing purposes, the disk with the lowest load thereon is selected. Once the disk is selected, the method proceeds to step 26 "READ NEXT BLOCK", where the next block of the file is read.

If, at INQUIRY step 24 "END OF FILE?", the end of the file is reached, the user will have completed reading the desired file and the user will exit the system as set forth in step 27 "EXIT".

In reference back to FIG. 2A, even though the disk with the lowest load was selected in step 20, it is possible that the load on the selected disk D is still above the threshold value. If that is the case, the method will not begin to read stream, as set forth in step 22, but instead will continue on to step 29, "CHOOSE STREAM TO REPLICATE". Therefore, if the load on Disk D is above the threshold the process proceeds to this step 29.

In this step 29, a stream to be replicated is chosen. With regard to a sequentially read file, there are many streams which may concurrently have access to that file. For instance, multiple users may simultaneously access and read a file. For example, one user may have access to the file at time, t=5 minutes, another user may have access to the file at time, t=30 minutes, and a third user may have access to the file at a time, t=1 hour. Therefore, at this step 29, a decision is made as to which stream to replicate. The choice of which stream to replicate depends on many factors; for instance, whether it is desired that switching occur quickly, and if so, then the stream reading at time, t=5 minutes, would be chosen for replication. In such a case, the user may switch to a different disk when time=5 minutes is reached. Various techniques may be used to determine which stream to replicate, depending on whether long term load balancing or short term load balancing is sought. The invention is therefore not limited to any one particular technique.

Once the specific stream to replicate is chosen, the method proceeds to step 30, "CHOOSE DISK, D2, ON WHICH TO REPLICATE". At this step, the selected disk D2 preferably has the maximum amount of space available. The method then proceeds to the next step 31 "CREATE SWITCHING POINT ENTRY IN THE FILE INFORMATION TABLE". At this step 31 the location where the replicated file starts is recorded in a stored information table. The information table may therefore contain a plurality of switching point entry locations therein. In addition, the file information table contains file id numbers for each file, and replica addresses for each replicated file portion. The switching point entry locations allow the system to facilitate the switching from one file on a particular disk to remaining portions of the same file located on a different disk or disks. An example of a file information table is depicted in FIG. 6.

Figure 2B:
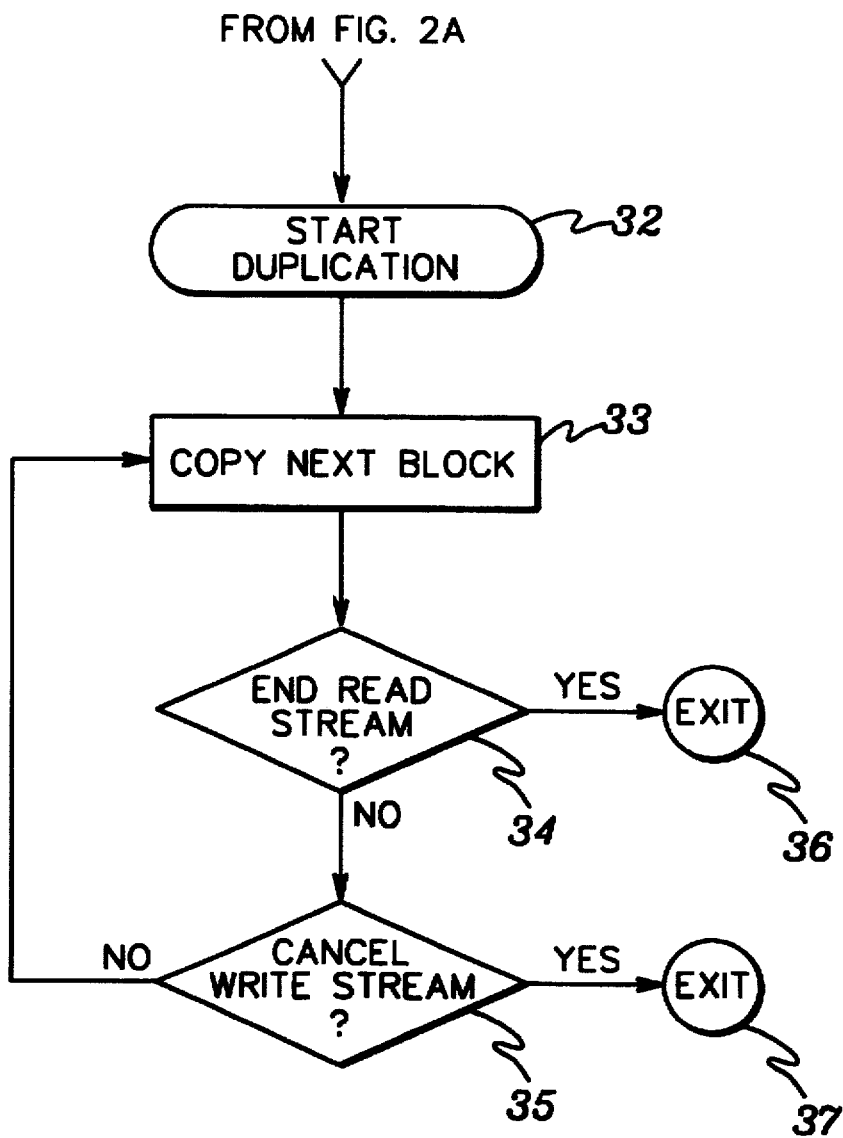
Figure 2C:
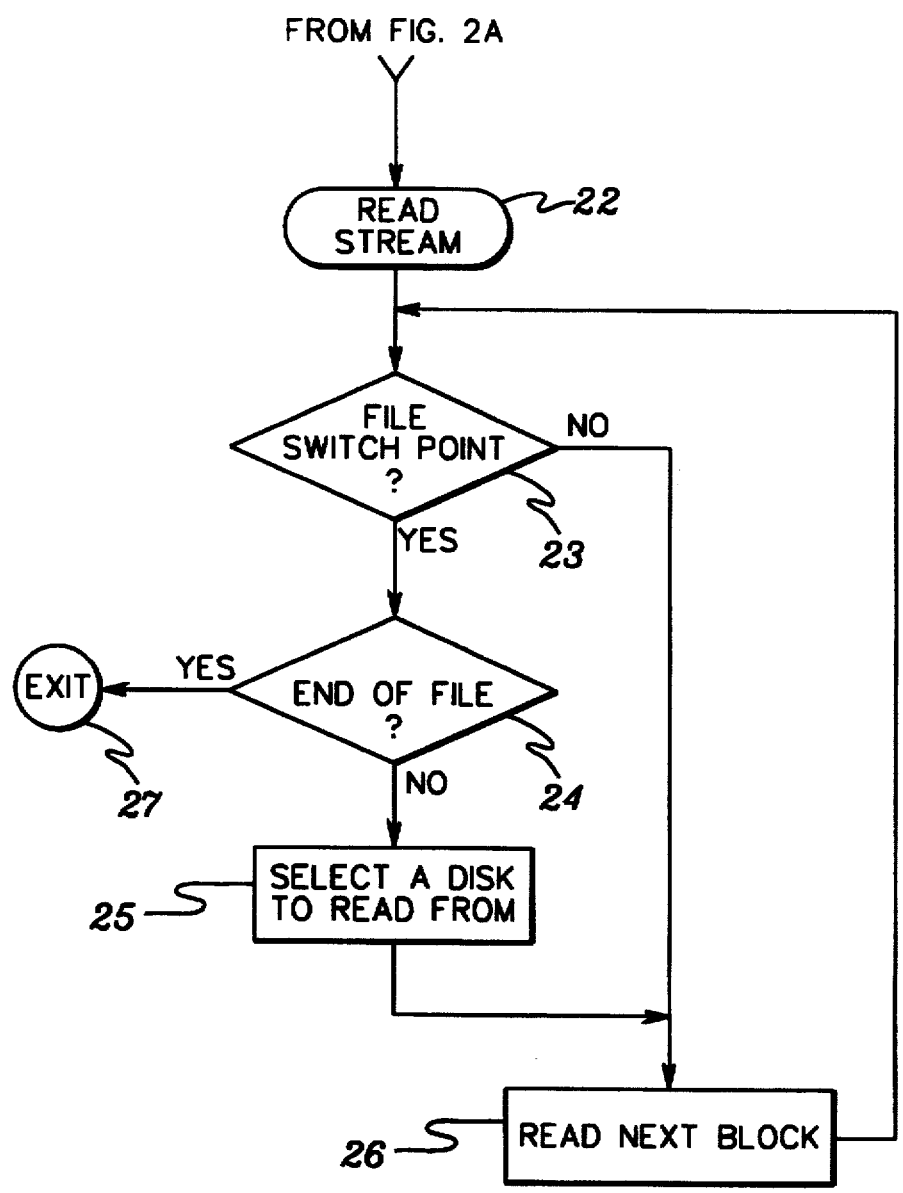

As set forth in FIG. 2B, the method proceeds to initial step 32 to start replicating the chosen stream onto the chosen disk D2. As mentioned above, a file on a storage device consists of a series of small blocks. Replication involves reading and writing, in series, those blocks from one disk to another disk. The method thus proceeds to step 33 "COPY NEXT BLOCK". Here, as a block of a file is read from disk D it is simultaneously written onto replication disk D2. Once a block of the file is read, the method proceeds to INQUIRY step 34 "END READ STREAM?", where it is determined whether or not the stream has been completely read or in other words, whether the accessed file has been completely read by the user. If it is determined that the end of the read stream has been reached, then replication onto disk D2 is complete. If the end of read stream has not been reached, then the method proceeds to INQUIRY step 35 "CANCEL WRITE STREAM?". At this step 35, it is determined if the reading stream has come to a file switch point. When a switch point is reached, this is an indication that a replica of the file presently being replicated, beginning at the next read block, is available in another disk. Therefore, an alternative replica or even alternative replicas already exist in other disks. If a switch point is reached, then the write stream is canceled, and replication ceases. However, if a switch point is not reached, the method reverts to step 33, where the next block is read from disk D and simultaneously written onto disk D2, thus continuing replication.

In accordance with the present invention, and as set forth above, load balancing may involve replicating arbitrary portions of a file. Since a file is divided up into a huge number of blocks, a replicated portion of a file may consist of a series of any number of blocks. Theoretically, a replicated portion of a file could consist of a single block. Practically speaking, however, such a replication would not occur because a block is such a small unit. In order to perform load balancing in a file server, as described in the above embodiment, an extensive directory of each file will be needed to inventory each and every arbitrary portion. This directory will contain file switching points, file id numbers, and replica addresses which will permit streams to be shifted from one disk to another disk, thereby performing load balancing across the system.

A further embodiment of the present invention may involve segmentation, or in other words, dividing each file into a small number of segments. For example, a file may be divided into the following number of segments: 8, 16, 32, 64, 128, and so forth. Each segment, in turn, may comprise a large number of blocks. Replication, in this embodiment, may no longer involve replicating arbitrary portions of files. Instead, replication may involve segments, and every segment replicated is preferably the same size as every other segment. Moreover, as previously described in reference to block portions, a file information table may inventory the segments of each file. However, this directory may not be as extensive as a directory containing information regarding arbitrary block portions of files. Furthermore, in addition to segmentation, the present invention may allow primary/secondary assignment control, discussed infra.

In the further embodiment, each file may contain primary segments. Primary segments are permanent and cannot be deleted or overwritten for replication purposes. In addition, each file may comprise secondary segments. Secondary segments are temporary segments, and as such, they may be overwritten and thus deleted. Primary/secondary assignment control allows for certain primary segments to be transformed into secondary segments, and vice versa. Therefore, if there is an excess number of primary segments, the excess may be converted into secondary, thereby allowing these newly converted secondary segments to be overwritten by replication.

As such, referring to the flow diagram of FIGS. 3A–3B, a further embodiment of the present invention will be described. In this embodiment files are segmented into a fixed number of preferably equally-sized segments, thus providing the benefits of dynamic replication, without the need to keep track of arbitrary portions of files.

Figure 3A:
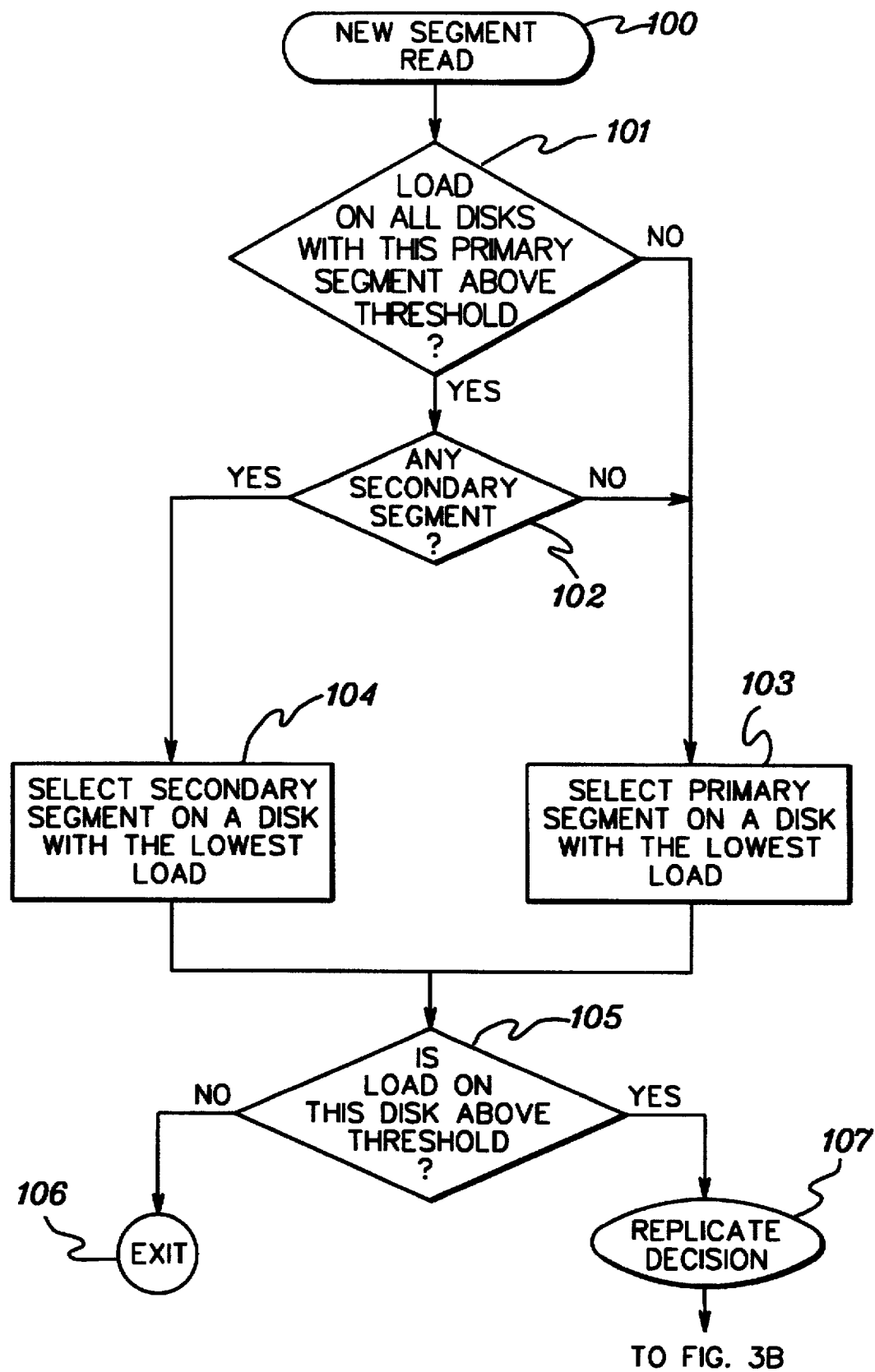
FIG. 3A–3B depict a second flow diagram of the logic operations of the method and system for improving load balancing in a file server in accordance with the principles of the present invention.
Figure 3B:
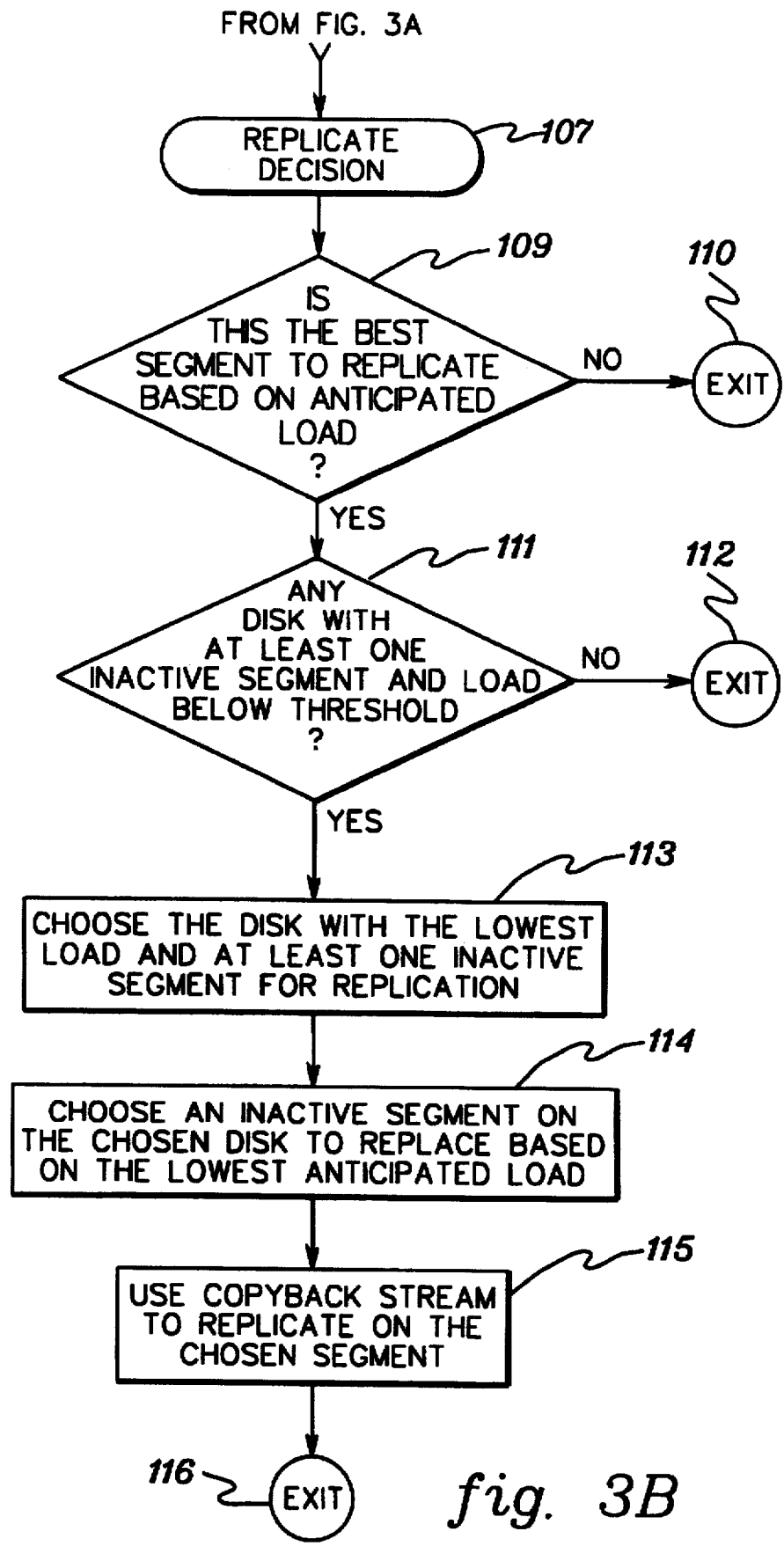

In accordance with the present invention and referring to the flow diagram of FIG. 3A, the method initially starts with step 100 "NEW SEGMENT READ". Here, a user accesses the desired file which therefore involves reading a segment. Segments may be either primary or secondary. A primary segment is a permanent copy which cannot be deleted or overwritten. A secondary segment is a temporary copy which may be deleted. The existence of primary and secondary segments allows the system to utilize a space management technique for improving load balancing in a file server. Although a determination of the availability of bandwidth was not inquired into with FIG. 3A, such a determination may be performed in accordance with FIG. 2A. Furthermore, also in accordance with FIG. 2A, the existing loads on all the disks may be rebalanced.

At the next step in the method, step 101, "LOAD ON ALL DISKS WITH THIS PRIMARY SEGMENT ABOVE THRESHOLD?", it is determined whether any of the disks on which the primary segments are located are above threshold. Since certain files may be "hot", i.e., heavily accessed, multiple primary segments of the same file may exist on different disks or storage devices. Having multiple primary segments of the same file on different disks may prevent future load imbalance problems due to access to frequently accessed "hot" files.

If the load on all the disks containing the primary segment sought to be read is not above threshold, the method proceeds to step 103, "SELECT PRIMARY SEGMENT ON A DISK WITH THE LOWEST LOAD". Since there may be multiple primary copies of the segment sought to be read, it is desirable to select the primary segment located on the disk currently having the lowest load. The method then proceeds to INQUIRY step 105, "IS LOAD ON THIS DISK ABOVE THRESHOLD?" At this step 105, a determination is again made as to whether this disk is above threshold. Based on the path so far taken, however, this step 105 may be merely a repeat of step 101.

If at step 101 the load on all the disks with the primary segment is above threshold, then proceed to INQUIRY step 102, "ANY SECONDARY SEGMENT?". Here, a determination is made as to whether any secondary segment of the file is available to be read. If a secondary segment is available to be read, the method proceeds to step 104 "SELECT SECONDARY SEGMENT ON A DISK WITH THE LOWEST LOAD." Since it is possible that multiple secondary segments exist, the secondary segment located on the disk with the lowest load is sought. Selecting the disk with the lowest load performs a load balancing function. Once this disk is selected, the method proceeds to INQUIRY step 105 "IS LOAD ON THIS DISK ABOVE THRESHOLD?" Since no determination has been made as to whether the load on this disk with the secondary segment is above threshold, this step 105, determines if a disk bottleneck is approaching. Step 105 thus inquires as to whether there is a load imbalance. If the load on this disk is not above the threshold value, then the entire segment is read (block by block) and the method reverts back to step 100 "NEW SEGMENT READ" so that a new segment may be read.

If there is no secondary segment, then the method continues to step 103, where the primary segment on a disk with the lowest load is selected. As already determined in step 101, the load on all disks with this primary segment are above threshold. Therefore, the primary segment on the disk with the lowest load, albeit above threshold, is selected. From here, the method proceeds to step 105, "IS LOAD ON THIS DISK ABOVE THRESHOLD?", where it is again determined if there is a load imbalance. In this step, however, it has already been determined in step 101 that the load on this disk with this primary segment is above threshold. Therefore, based on the path taken through the method, the load on this disk may be above threshold, and a decision about replication must be made.

Thus, since the load on this disk is above threshold, the method proceeds to initial step 107 "REPLICATE DECISION", and a decision about replication begins. The first step in the replicate decision is step 109, "IS THIS THE BEST SEGMENT TO REPLICATE BASED ON ANTICIPATED LOAD?" At this point, the reason to replicate is because there is not enough disks which have the accessed file stored and therefore it is desirable to replicate portions of that file onto another disk. This step 109 determines if the particular segment at hand is the best segment for replication. Based on the load on particular segments of a file, the method disclosed herein determines whether this segment is the best segment to copy. If the segment at hand is not the best segment to replicate, then nothing is done with respect to that segment, meaning that this particular segment will not be replicated onto another disk. Thus, if the best segment is not identified, the entire segment is read (block by block) and the method reverts to new segment read (FIG. 3A). With segmentation, as disclosed in this embodiment, only entire segments may be replicated, and partial segments can not be replicated.

If the best segment to replicate based on the anticipated load is identified, then the method proceeds to INQUIRY step 111 "ANY DISK WITH AT LEAST ONE INACTIVE SEGMENT AND LOAD BELOW THRESHOLD?". This step 111 determines which disk upon which to replicate the identified best segment. This step 111 therefore involves space management and bandwidth considerations. Bandwidth considerations dictate that replication onto another disk only take place if the load on that disk is below a certain threshold value. If the load on all the available disks is above the certain set threshold value, there is no need for replication because only a limited number of requests may be serviced anyhow. In addition, there must be sufficient space in the disk into which this segment of the file will be replicated, and if sufficient space in the disk does not exist, there is no benefit from replication. Therefore, step 111 first determines if there is a disk with at least one inactive segment. An inactive segment is defined as a segment that is presently not being read from or written to. If there is no disk below threshold which has at least one inactive segment, then the entire segment is read (block by block), and the method reverts to new segment read (FIG. 3A). If there is at least one inactive segment on at least one disk whose load is below threshold, then the method proceeds to step 113 "CHOOSE THE DISK WITH THE LOWEST LOAD AND AT LEAST ONE INACTIVE SEGMENT FOR REPLICATION." At step 113, if there is more than one disk with at least one inactive segment, the disk with the lowest load is chosen. Even though a disk may have more than one inactive segment, only one inactive segment for replication is needed.

The next step 114 "CHOOSE AN INACTIVE SEGMENT ON THE CHOSEN DISK TO REPLACE BASED ON THE LOWEST ANTICIPATED LOAD", where the most logical inactive segment, based on anticipated load, is chosen to be replaced. As an example, suppose disk 2 is found to be the disk with the lowest load with at least one inactive segment. In fact, disk 2 is found to have two inactive segments, both from the same file A, and these two inactive segments are, for example, inactive segment 3 and inactive segment 7. A closer look at the load contained in file A shows that the load on active segment 6 is quite high. Based on the load on active segment 6, and due to the sequential reading of files, it is known that the load on segment 6 eventually must pass through inactive segment 7. Therefore, the anticipated load on segment 7 is high, and it is not logical to overwrite inactive segment 7. Instead, inactive segment 3, based on the anticipated load, is the best inactive segment to overwrite.

Once the inactive segment to be replaced is chosen then the method proceeds to step 115 "USE COPYBACK STREAM TO REPLICATE ON THE CHOSEN SEGMENT", where while the segment is read the segment is simultaneously written onto the chosen inactive segment. Therefore, replication involves copying block-by-block.

Periodically, a primary to secondary assignment technique and a secondary to primary technique may be executed. These methods involve inquiring into how often the primary and secondary segments are being accessed. Therefore, this method determines those segments that should be kept on a long term basis. By definition, the primary segment is a permanent segment, and cannot be deleted or overwritten. The secondary segment, on the contrary, is a temporary segment and may be deleted. Therefore, it is desirable to declare certain secondary segments, based on load history, as primary segments thereby avoiding deletion of those secondary segments. Furthermore, it is desirable to declare certain primary segments as secondary segments to allow space to become available for replication. The following primary/secondary assignments thus determines what segments to keep on a long term basis, and also what disk these segments are to be stored. Traditionally, this primary-to-secondary and secondary-to-primary assignment is known as file allocation.

Figure 4:
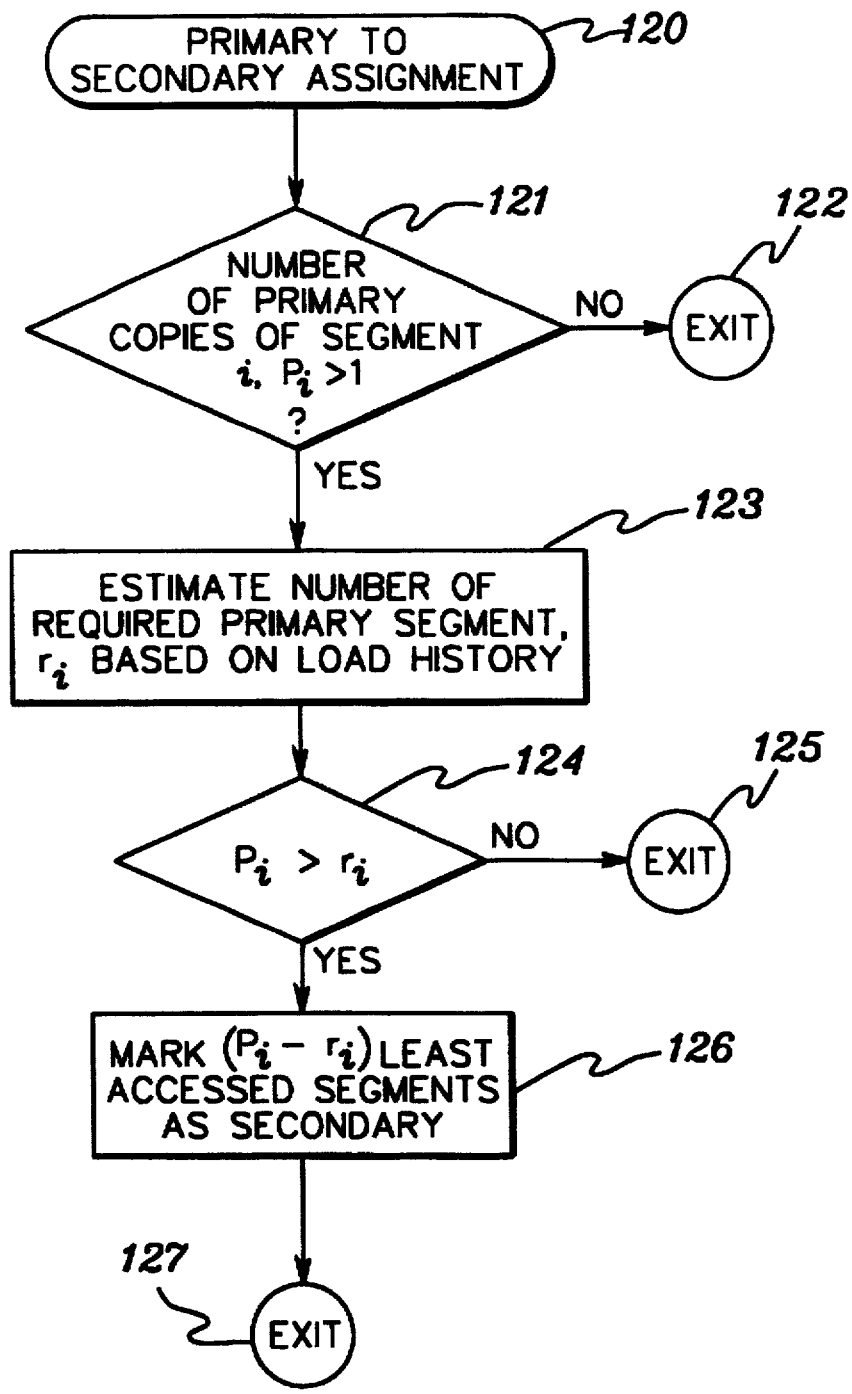
FIG. 4 depicts a flow diagram of the logic operations of the method and system for improving load balancing in a file server in accordance with the principles of the present invention.

The flow diagram of FIG. 4 describes the primary-to-secondary assignment. The method initially starts at step 120 "PRIMARY TO SECONDARY ASSIGNMENT", and proceeds to INQUIRY step 121, "NUMBER OF PRIMARY COPIES OF SEGMENT i, $P_i$ >1." At this step 121, the number of primary copies of a segment are counted to determine whether multiple primary segments exist. For instance, primary segment 1 is labelled $P_1$, primary segment 2 is labelled $P_2$, primary segment 3 is labelled $P_3$, and so forth. For each primary segment P, there will be $P_i$ copies, and at least one primary segment. If the number of primary copies of a segment ($P_i$) is not greater than one, then no primary-to-secondary assignment of this primary segment can occur and the method exits to step 122. There can be no assignment of a primary segment to a secondary segment if only one primary segment exists because if the sole primary copy were assigned to become a secondary segment, the secondary segment could possibly be deleted. As such, if a single primary segment of a file is deleted, users would not have access to that particular segment.

However, if there are multiple primary copies of a segment, then the method proceeds to step 123 "ESTIMATE NUMBER OF REQUIRED PRIMARY SEGMENTS, $r_i$, BASED ON LOAD HISTORY". For instance, if on average, a load on a particular file amounts to a number of streams equal to X, but the maximum number of streams which the disk where the file is located can support is only X-10 streams, then it is evident that at least two primary copies of the file on at least two separate disks is needed. If two files on two separate disks do not exist, then no bandwidth is available to allow access to a number of X users. Thus, based on the load history, step 123 determines the number of required primary segments necessary.

Once step 123 is completed, the method proceeds to INQUIRY step 124 "$P_i > r_i$?". Here it is determined if the required number of primary segments ($r_i$) is greater than the actual number of primary segments ($P_i$). If the required number of primary segments ($r_i$) is greater than the actual primary segments ($P_i$), then the method proceeds to step 125 "EXIT". At this point, since there is not enough primary segments, the method does not assign a primary segment as a secondary segment. However, if the number of primary segments ($P_i$) is greater than the number of required segments ($r_i$), then those additional primary segments ($P_i - r_i$) are unnecessary and they are marked as secondary segments. These newly converted secondary segments are now available to be overwritten, and hence, additional replication space is created.

Figure 5:
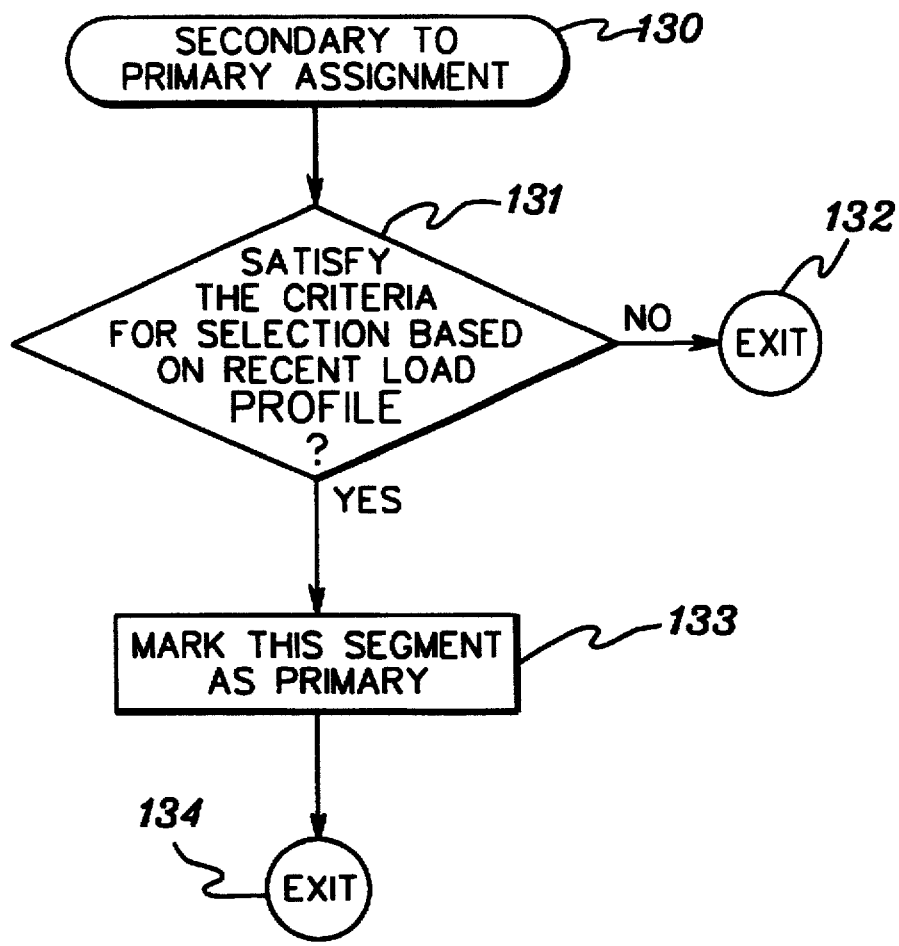
FIG. 5 depicts a flow diagram of the logic operations of the method and system for improving load balancing in a file server in accordance with the principles of the present invention.

In addition, as is indicated in FIG. 5, there is a secondary-to-primary assignment which converts certain secondary segments into primary segments. This conversion, or assignment, initially begins at step 130 "SECONDARY TO PRIMARY ASSIGNMENT", and proceeds to INQUIRY step 131 "SATISFY THE CRITERIA FOR SELECTION BASED ON RECENT LOAD PROFILE?". Here, the examination of the secondary segment may show that this particular segment is highly loaded. A threshold mechanism or a waiting mechanism based on time may be used to make this determination. For example, an exponential weight may be assigned based on different time windows. Greater weight will be assigned to recent loads, and therefore the recent load history is more important than the variable load history. Based on the load history therefore, it is decided whether this segment satisfies the criteria for being declared a primary, or permanent segment. If the criteria is met, the method proceeds to step 133 "MARK THIS SEGMENT AS PRIMARY" and the secondary segment is marked as primary so that it becomes a permanent copy, which does not allow it to be overwritten by another segment.

While the invention has been described with references to the embodiments thereof, it will be understood by those skilled in the art that various modifications may be made without departing, in any way, from the spirit and scope of the invention as defined in the following claims.

We claim:

1. A method for improving load balancing in a file server comprising:
   determining the existence of an overload condition on a first storage device, said first storage device having a plurality of retrieval streams accessing at least one file thereon;
   selecting a first retrieval stream reading a file;
   replicating a portion of said file while being read by said first retrieval stream onto a second storage device; and
   reading said replicated portion of said file on said second storage device with a retrieval stream capable of accessing said replicated portion of said file.

2. The method of claim 1 wherein determining the existence of an overload condition on the first storage device includes detecting a threshold level on said first storage device.

3. The method of claim 1 wherein said first retrieval stream is selectively chosen from a plurality of retrieval streams reading said file.

4. The method of claim 1 wherein said second storage device is chosen from a plurality of available storage devices, said second storage device having the largest available amount of storage space.

5. The method of claim 1 wherein replicating a portion of said file being read by said first retrieval stream onto said second storage device includes initially creating a switching point entry on a file information table so that said portion of said file can be indexed for ease of switching between said second storage device and another storage device.

6. The method of claim 1 wherein said file comprises a plurality of blocks.

7. The method of claim 6 wherein said file comprises a plurality of segments, each of said plurality of segments comprising a plurality of blocks.

8. The method of claim 1 wherein said file comprises a plurality of segments and said portion of the file being replicated comprises one or more segments.

9. The method of claim 1 where in said file includes at least one primary segment.

10. The method of claim 9 wherein said file includes a plurality of primary segments.

11. The method of claim 10 wherein said primary segments are permanent segments.

12. The method of claim 1 wherein said file server comprises a multimedia file server.

13. The method of claim 1 wherein said storage device comprises a disk.

14. The method of claim 1 wherein said file server comprises a video server, and wherein said file comprises a video file.

15. A method for improving load balancing in a file server comprising:
   determining the existence of an overload condition on a first storage device, said first storage device having a plurality of retrieval streams accessing at least one file thereon;
   selecting a first retrieval stream reading a file;
   replicating a portion of said file being read by said first retrieval stream onto a second storage device; and
   reading said replicated portion of said file on said second storage device with a retrieval stream capable of accessing said replicated portion of said file;
   wherein said replicating a portion of said file being read by said first retrieval stream onto a second storage device comprises:
     reading said file using said first retrieval stream from said first storage device; and
     writing said portion of said file using a retrieval stream capable of accessing said replicated portion of said file onto said second storage device.

16. A method for improving load balancing in a file server comprising:
   determining the existence of an overload condition on a first storage device, said first storage device having a plurality of retrieval streams accessing at least one file thereon;
   selecting a first retrieval stream reading a file;
   replicating a portion of said file being read by said first retrieval stream onto a second storage device; and
   reading said replicated portion of said file on said second storage device with a retrieval stream capable of accessing said replicated portion of said file;
   wherein said file includes at least one permanent, primary segment; and
   wherein said replicated portion of said file comprises at least one secondary segment.

17. The method of claim 16 wherein said secondary segment is a temporary segment.

18. The method of claim 17 wherein said secondary segment may be deleted.

19. The method of claim 15 further comprising converting one of said at least one primary segment to a secondary segment.

20. The method of claim 18 further comprising converting one of said at least one secondary segment to a primary segment.

21. A method for improving load balancing in a file server comprising:
   determining the existence of an overload condition on a first storage device, said first storage device having a plurality of retrieval streams accessing at least one file thereon;
   selecting a first retrieval stream reading a file;
   replicating a portion of said file being read by said first retrieval stream onto a second storage device; and
   reading said replicated portion of said file on said second storage device with a retrieval stream capable of accessing said replicated portion of said file;
   wherein said file comprises a plurality of blocks; and
   wherein replicating said portion of said file being read by said first retrieval stream onto said second storage device comprises:
      sequentially reading said plurality of blocks from said first retrieval stream; and
      writing one or more of said plurality of blocks onto said second storage device.

22. A method for improving load balancing in a file server comprising:
   determining the existence of an overload condition on a first storage device, said first storage device having a plurality of retrieval streams accessing at least one file thereon;
   selecting a first retrieval stream reading a file;
   replicating a portion of said file being read by said first retrieval stream onto a second storage device; and
   reading said replicated portion of said file on said second storage device with a retrieval stream capable of accessing said replicated portion of said file;
   wherein said file comprises a plurality of segments, each of said plurality of segments comprising a plurality of blocks; and
   wherein replicating said portion of said file being read by said first retrieval stream onto said second storage device comprises:
      sequentially reading at least one of said segments from said first retrieval stream; and
      writing at least one of said segments on to said second storage device.

23. A method for improved load balancing in a file server comprising:
   determining an excess number of permanently stored primary copies of a segment of a file;
   converting one of said permanently stored primary copies of said segment, not being accessed, to a temporary secondary copy of said segment, wherein said secondary copy of said segment is capable of being overwritten; and
   overwriting said secondary copy of said segment for improving the load balancing in said file server.

24. A method for improved load balancing in a file server comprising:
   determining an excess number of permanently stored primary segments of a file;
   estimating a required number of primary segments based on load history;
   converting one of said permanently stored primary segments, not being accessed, to a temporary secondary segment wherein said secondary segment is capable of being overwritten; and
   overwriting said secondary for improving the load balancing in said file server.

25. The method claim 24 further comprising converting all permanently stored primary segments greater than said required number of primary segments.

26. A method for improved load balancing in a file server comprising:
   determining a load on a temporarily stored secondary copy of a segment of a file;
   determining if said load on said secondary copy of said segment exceeds a threshold value, and
   converting said temporarily stored secondary copy of said segment to a permanently stored primary copy of said segment of said file, wherein said primary copy of said segment is prevented from being overwritten.

27. A method for improved load balancing in a file server comprising:
   determining a load on a temporarily stored secondary segment of a file including determining a variable load history for said secondary segment;
   determining if said load on said secondary segment exceeds a threshold value; and
   converting said temporarily stored secondary segment to a permanently stored primary segment of said file, wherein said primary segment is prevented from being overwritten.

28. The method of claim 27 further comprising analyzing said variable load history for determining whether said threshold value is exceeded.

29. A system for improving load balancing in a file server comprising:
   means for determining the existence of an overload condition on a first storage device, said first storage device having a plurality of retrieval streams accessing at least one file thereon;
   means for selecting a first retrieval stream reading a file;
   means for replicating a portion of said file while being read by said first retrieval stream onto a second storage device; and
   means for reading said replicated portion of said file on said second storage device with a retrieval stream capable of accessing said replicated portion of said file.

30. The system of claim 29 wherein said determining means determines the existence of an overload condition on the first storage device by detecting a threshold level on said storage device.

31. The system of claim 29 wherein said first retrieval stream is selectively chosen from a plurality of retrieval streams reading said file.

32. The system of claim 29 wherein said second storage device is chosen from a plurality of available storage devices, said second storage device having the largest available amount of storage space.

33. The system of claim 29 wherein said means for replicating a portion of said file being read by said first retrieval stream onto said second storage device includes means for initially creating a switching point entry on a file information table so that said portion of said file can be indexed for ease of switching between said second storage device and another storage device.

34. The system of claim 29 wherein said file comprises a plurality of blocks.

35. The system of claim 34 wherein each of said file comprises a plurality of segments, each of said plurality of segments comprising a plurality of blocks.

36. The system of claim 29 wherein said file comprises a plurality of segments and said portion of the file being replicated comprises one or more segments.

37. The system of claim 29 wherein said file includes at least one primary segment.

38. The system of claim 37 wherein said file includes a plurality of primary segments.

39. The system of claim 38 wherein said primary segments are permanent segments.

40. The system of claim 29 wherein said file server comprises a multimedia file server.

41. The system of claim 29 wherein said storage device comprises a disk.

42. The system of claim 29 wherein said file server comprises a video server, and wherein said file comprises a video file.

43. A system for improving load balancing in a file server comprising:
    means for determining the existence of an overload condition on a first storage device, said first storage device having a plurality of retrieval streams accessing at least one file thereon;
    means for selecting a first retrieval stream reading a file;
    means for replicating a portion of said file being read by said first retrieval stream onto a second storage device; and
    means for reading said replicated portion of said file on said second storage device with a retrieval stream capable of accessing said replicated portion of said file;
    wherein said means for replicating a portion of said file being read by said first retrieval stream onto a second storage device comprises:
        means for reading said file using said first retrieval stream from said first storage device; and
        means for writing said portion of said file using a retrieval stream capable of accessing said replicated portion of said file onto said second storage device.

44. A system for improving load balancing in a file server comprising:
    means for determining the existence of an overload condition on a first storage device, said first storage device having a plurality of retrieval streams accessing at least one file thereon;
    means for selecting a first retrieval stream reading a file;
    means for replicating a portion of said file being read by said first retrieval stream onto a second storage device; and
    means for reading said replicated portion of said file on said second storage device with a retrieval stream capable of accessing said replicated portion of said file;
    wherein said file includes at least one permanent, primary segment; and
    wherein said replicated portion of said file comprises at least one secondary segment.

45. The system of claim 44 wherein said secondary segment is a temporary segment.

46. The system of claim 45 wherein said secondary segment may be deleted.

47. The system of claim 46 further comprising means for converting one of said at least one primary segment to a secondary segment.

48. The system of claim 46 further comprising means for converting one of said at least one secondary segment to a primary segment.

49. A system for improving load balancing in a file server comprising:
    means for determining the existence of an overload condition on a first storage device, said first storage device having a plurality of retrieval streams accessing at least one file thereon;
    means for selecting a first retrieval stream reading a file;
    means for replicating a portion of said file being read by said first retrieval stream onto a second storage device; and
    means for reading said replicated portion of said file on said second storage device with a retrieval stream capable of accessing said replicated portion of said file;
    wherein said file comprises a plurality of blocks; and
    wherein said means for replicating said portion of said file being read by said first retrieval stream onto said second storage device comprises:
        means for sequentially reading said plurality of blocks from said first retrieval stream; and
        means for writing one or more of said plurality of blocks onto said second storage device.

50. A system for improving load balancing in a file server comprising:
    means for determining the existence of an overload condition on a first storage device, said first storage device having a plurality of retrieval streams accessing at least one file thereon;
    means for selecting a first retrieval stream reading a file;
    means for replicating a portion of said file being read by said first retrieval stream onto a second storage device; and
    means for reading said replicated portion of said file on said second storage device with a retrieval stream capable of accessing said replicated portion of said file;
    wherein said file comprises a plurality of segments, each of said plurality of segments comprising a plurality of blocks; and
    wherein said means for replicating said portion of said file being read by said first retrieval stream onto said second storage device comprises:
        means for sequentially reading at least one of said segments from said first retrieval stream; and
        means for writing at least one of said segments on to said second storage device.

51. A system for improved load balancing in a file server comprising:
    means for determining an excess number of permanently stored primary copies of a segment of a file;
    means for converting one of said permanently stored primary copies of said segment, not being accessed, to a temporary secondary copy of said segment, wherein said secondary copy of said segment is capable of being overwritten; and
    means for overwriting said secondary copy of said segment for improving the load balancing in said file server.

52. A system for improved load balancing in a file serve comprising:

means for determining an excess number of permanently store primary segment of a file;

means for estimating a required number of primary segments based on load history;

means for converting one of said permanently stored primary segments, not being accessed, to a temporary secondary segment, wherein said secondary segment is capable of being overwritten; and means for overwriting said secondary segment for improving the load balancing in said server.

53. The system claim 52 further comprising means for converting all permanently stored primary segments greater than said required number of primary segments.

54. A system for improved load balancing in a file server comprising:

means for determining a load on a temporarily stored secondary copy of a segment of a file;

means for determining if said load on said secondary copy of said segment exceeds a threshold value; and means for converting said temporarily stored secondary copy of said segment to a permanently stored primary copy of said segment of said file, wherein said primary copy of said segment is prevented from being overwritten.

55. A system for improved load balancing in a file server comprising:

means for determining a load on a temporarily stored secondary segment of a file including means for determining a variable load history for said secondary segment;

means for determining if said load on said secondary segment exceeds a threshold value; and means for converting said temporarily stored secondary segment to a permanently stored primary segment of said file, wherein said primary segment is prevented from being overwritten.

56. The method of claim 55 further comprising means for analyzing said variable load history for determining if said threshold value is exceeded.

* * * * *

UNITED STATES PATENT AND TRADEMARK OFFICE
CERTIFICATE OF CORRECTION

PATENT NO. : 5,802,301
DATED : September 01, 1998
INVENTOR(S) : Dan et al.

It is certified that error appears in the above-identified patent and that said Letters Patent is hereby corrected as shown below:

In the Claims:

Claim 18, Col. 13, line 5, delete "15" and replace with --18--.

Claim 52, Col. 17, line 2, delete "store primary segment" and replace with --stored primary segments--.

Signed and Sealed this

Second Day of March, 1999

Attest:

Q. TODD DICKINSON

Attesting Officer

Acting Commissioner of Patents and Trademarks